(12) United States Patent
Hu et al.

(10) Patent No.: US 10,236,763 B2
(45) Date of Patent: Mar. 19, 2019

(54) REVERSE CURRENT BLOCKAGE THROUGH BUCK CONTROLLER BLOCK

(71) Applicant: Power Integrations, Inc., San Jose, CA (US)

(72) Inventors: Zongqi Hu, Fremont, CA (US); Tiziano Pastore, Los Gatos, CA (US); Peter Vaughan, Los Gatos, CA (US); Yury Gaknoki, San Jose, CA (US); Jose Requinton Del Carmen, Jr., San Jose, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 415 days.

(21) Appl. No.: 14/818,186

(22) Filed: Aug. 4, 2015

(65) Prior Publication Data

US 2017/0040883 A1 Feb. 9, 2017

(51) Int. Cl.
*H02M 1/32* (2007.01)
*H02M 3/156* (2006.01)

(52) U.S. Cl.
CPC ............. *H02M 1/32* (2013.01); *H02M 3/156* (2013.01)

(58) Field of Classification Search
CPC ...... H02M 1/32; H02M 3/156; H02M 3/1588; H02M 2001/0032; H02M 2001/0009; H02M 3/158; Y02B 70/1466; Y02B 70/16; H05B 33/0815; H05B 33/0848
See application file for complete search history.

(56) References Cited

U.S. PATENT DOCUMENTS

| 7,598,715 | B1* | 10/2009 | Hariman | H02M 3/1588 323/222 |
| 8,810,157 | B2 | 8/2014 | Del Carmen, Jr. | |
| 2006/0113980 | A1* | 6/2006 | Yoshida | H02M 3/1588 323/282 |
| 2008/0012540 | A1* | 1/2008 | Chen | H02M 1/38 323/224 |
| 2011/0304279 | A1* | 12/2011 | Felty | H05B 41/2925 315/307 |

* cited by examiner

*Primary Examiner* — Henry Lee, III
(74) *Attorney, Agent, or Firm* — Christensen O'Connor Johnson Kindness PLLC (57) ABSTRACT

A switching circuit with reverse current prevention for use in a Buck converter includes a power switch coupled to a coupling node, which is an interconnection point of a power switch, an inductor and a freewheeling diode of the Buck converter. The inductor is coupled between the coupling node and an output of the Buck converter, and the freewheeling diode is coupled between coupling node and an output return of the Buck converter. A controller is coupled to receive a feedback signal to control switching of the power switch to regulate a transfer of energy from the input to the output of the Buck converter. A reverse current prevention circuit is coupled to detect a reverse current condition of the power switch to generate an inhibit signal to inhibit the power switch from receiving a drive signal to prevent a reverse current through the power switch.

19 Claims, 7 Drawing Sheets

REVERSE CURRENT BLOCKAGE THROUGH BUCK CONTROLLER BLOCK

BACKGROUND INFORMATION

Field of the Disclosure

The present disclosure relates generally to power converters and, more specifically, to non-isolated Buck converters.

Background

Conventional wall outlets generally deliver a high voltage alternating current (ac) power that needs to be transformed to direct current (dc) power before being used to power many electronic devices. Switched mode power converters are commonly used due to their high efficiency, small size, low weight, and safety protection features, to convert the high voltage ac power to a regulated dc power. For example, switch mode power converters are commonly used in drive circuitry in the lighting industry to provide dc power for various lamp types, such as compact fluorescent lamps (CFLs), Halogen lamps, or light emitting diode (LED) bulbs.

Output regulation in a switch mode power converter is usually provided by sensing a feedback signal from the output of the converter and controlling the power converter in a closed loop. In different control methods, the feedback or control signal may be used to modulate a duty cycle of a switching waveform (referred to as pulse width modulation, PWM), to change a switching frequency (referred to as pulse frequency modulation, PFM), or to disable some of the cycles of the switching waveform generated by the power converter controller (referred to as on-off control). Any of these control methods would result in control of the dc output voltage or current versus the load and line variations.

In applications where the output of the power converter can be accessible by the consumer, isolated converters are typically used to provide galvanic isolation between the output load and the input power line. However, in applications where the output of the power converter is not accessible by the consumer during normal operation, such as lamp drivers for LED (or CFLs or Halogen) bulbs, simple non-isolated converters, such as Buck converters are preferred due to their lower component counts, lower weights, and smaller sizes.

The feedback signal can be directly or indirectly extracted from a sense circuit coupled to the dc output of the converter. In a converter with a regulated output current, such as an LED driver, the current at the output may be monitored/sensed/measured to provide a feedback signal to the controller in order to control switching and the transfer of energy to the converter output. A typical way in prior art to measure the output current is to include a sense resistor at the output of the power converter such that the output current flows through the sense resistor. The resultant voltage across the sense resistor is proportional to the output current. However, the voltage drop across the sense resistor is typically large and often referenced to a voltage level different than that of the power converter controller. Thus, additional circuitry, such as an opto-coupler or a bias winding, is often needed to level shift the voltage across the sense resistor in order to interface with the controller.

The output signal may also be measured indirectly with reference to the controller ground. For instance, in a non-isolated high side switch Buck converter, the output feedback signal may be retrieved indirectly by sensing the current in the inductor, in the freewheeling diode or in the switch with reference to the controller ground.

A known issue in Buck converters is the risk of failure due to a reverse current through the Buck power switch when a negative voltage appears across the switch. This condition could inversely affect operation of power converter, and ultimately result in failure. Specifically, when a controller and a power switch are into a common die or in a single integrated circuit IC package, an inverse current may pass through the substrate, which can result in instability, controller latch, and in some circumstances failure of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The Buck converters are mostly used for applications such as fluorescent, CFL, halogen discharge lamps, and LED bulbs, which are today's popular lighting sources due to their higher lighting efficiency, lower heat loss, and other advantages. In particular, LED lights have become popular for both indoor and outdoor illumination due to their improved color spectrum and efficient light generation. For operation of such advanced lighting sources, different types of switch mode power converters can provide a well-regulated current or voltage source to drive these lamps. One efficient and cost effective example type of converter that may be used is the Buck non-isolated power converter. This type of converter has a simple structure, low component count, small size, and low weight, making it a suitable and popular candidate for these lighting applications.

In Buck converters, a controller controls switching of a switch to regulate the transfer of energy to the output of the converter. The controller may typically regulate the output in response to a feedback or sense signal representing the output current or voltage of the converter. If the sensed signal is not referenced to the controller reference level, then additional components may be required to shift the reference. Direct sensing of the output in a Buck converter with a high side switch in addition to the reference level shifting may result in more power dissipation, efficiency reduction, and heat dissipation, often resulting in the requirement of a larger heat emission surface.

The risk of failure due to the reverse current passing through the substrate, or in other words substrate conduction, would significantly be higher when switch and controller are integrated in a single "switching circuit" IC such as shown in FIGS. 1A, 1B, 1C, and FIG. 2. There are two general approaches to prevent failure due to the reverse current. In a first approach when condition for reverse current is detected (e.g., in a Buck converter in which $V_{in}<V_o$), the power switch is kept in an idle on-state (closed) with a low on-resistance ($R_{dson}$) to allow current passing through the body diode with a low voltage drop (~0.6V) and no risk of failure. In another approach, whenever the condition for reverse current is detected, the risk of failure is prevented by keeping the power switch in an idle off-state (open).

A Buck converter based on design considerations during the normal operation provides an output voltage lower than the input voltage $V_o<V_{in}$ (or in other words $V_o/V_{in}<1$). However, in some conditions input voltage may go below the output voltage. In one example it may happen in a rectified sinusoidal ac input voltage when a small or no input filter capacitor is applied. In such a condition, in each line cycle when the instantaneous input voltage comes near to the regulated output voltage, any negative oscillation may bring the input voltage below the output voltage, which increases the risk of reverse current and consequently failure. In other examples, any transient on the input or output voltages that may cause $V_{in}<V_o$ may also result in a possible reverse current and consequential failure (e.g., through the substrate of a MOSFET switch that is integrated in the controller die, which aggravates the risk of a controller failure).

The main relationship in a Buck converter, such as those illustrated in the examples shown in FIGS. 1A, 1B, 1C, 1D and FIG. 2, and which defines the current through the switch for the power converter during the switch on-state when the current through switch is the same as the inductor current, can be derived from the well-known equation (1) below:

$$V_{ind}=V_{in}-V_o=L1\cdot(di_{ind}/dt) \quad (1)$$

In one embodiment, the reverse current can directly be detected and prevented by measuring voltage across the power switch between the drain and source ($V_{DS}$) at the off-state while inductor current is discharging through the freewheeling diode, If voltage across the power switch $V_{DS}$ goes below a threshold ($V_{DS\_OffTh}$), then $V_{DS}\leq V_{DS\_OffTh}$, and $V_{DS\_OffTh}\sim V_o+V_{margin}$. In one example $V_{margin}=25V$. By detecting the reverse current condition, switching is stopped and power switch remains at off-state or on-state until the drain-source voltage ($V_{Ds}$) increases above the threshold voltage with a hysteresis ($V_{DS}\geq V_{DS\_OffTh}+V_{hy\_st}$). In a Buck converter with a high side switching circuit the controller is referenced to the low potential side of the switch. In the case of a power MOSFET switching device, the source terminal would be the reference voltage level Gnd 116 for the controller, and in the case of an integrated MOSFET in the controller with a tap terminal, the drain voltage $V_D$ 137 can be detected on the tap terminal. In one example, the tap terminal may also be coupled to the BP supply voltage.

In another embodiment, per equation (1) above, the reverse current detection could be during the on-state of the switch by detecting the drain current $i_d$ slope or the inductor current $i_{ind}$ slope ($di_D/dt$ or $di_{ind}/dt$). In one example the drain current slope can be measured internally in the controller. When the current slope approaches a minimum near zero threshold, it indicates that input voltage is approaching the output voltage ($V_{ind}=V_{in}-V_o\approx 0, V_{in}\approx V_o$ and switching stops. This prevents the risk of reverse current through the switch due to the input voltage dropping below the output voltage $V_{in}\leq V_o$.

FIGS. 1A, 1B, 1C and 1D introduce the general concept of reverse current detection and prevention in examples of a general non-isolated Buck converter that introduce the three possible example approaches to be included in the controller block to prevent any reverse current through the switch.

Figure 1A:
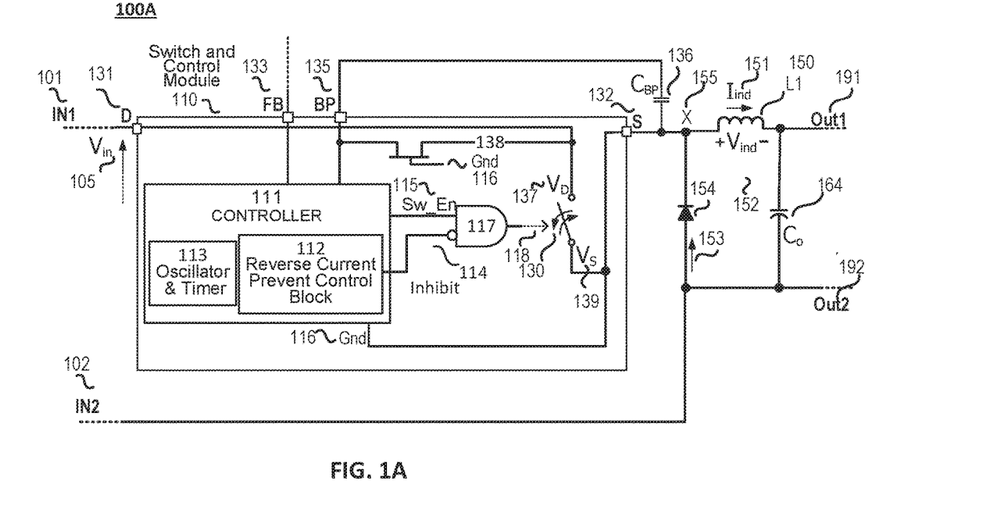
FIGS. 1A, 1B, 1C, and 1D are simplified circuit diagrams of example Buck converters having high side switching circuit with different examples of reverse current prevention.

FIG. 1A shows an example Buck converter 100A with high side switching circuit coupled to the input line IN1 101 and input line IN2 102 and having a power switch 130. In this example the power switch 130 is integrated, monolithic or hybrid, in the switching circuit 110. The controlled high frequency (HF) switching of power switch 130 transfers energy from the input port, IN1 101 and IN2 102, to the output port, OUT1 191 and OUT2 192, through the inductor 150, bulk output capacitance Co 164, and the freewheeling diode 154. When the power switch 130 is in the on-state (closed), current $I_{ind}$ 151 transfers the energy from input lines IN1 101 and IN2, to the output line OUT1 191 and the output line OUT2 192. When switch goes to off-state (opens), the inductor current $I_{ind}$ 151 freewheels (circulating current 153) through the freewheeling diode 154. The node X 155 is coupling node that is an interconnection point of power switch 130, inductor 150, and freewheeling diode 154. In the example, the source of power switch 130 is the reference potential for the controller 111. The switching circuit 110 may be a 4-pin or 5-pin device.

In the example illustrated in FIG.1A, the controller 111 includes the reverse current prevent control block 112 and the oscillator & timer 113 in accordance with the teachings of the present invention. Controller 111 receives bypass supply BP 135 and a feedback signal FB 133 and generates a switch enable signal $Sw_{13}$ En 115, which through the AND) gate 117 drives the power switch 130 to regulate a transfer of energy from input to the output of the Buck power converter. The reverse current prevent control block 112 detects any condition of reverse current through the switch, and generates an inhibit signal 114, which through the inverting input of the AND gate 117, gates drive signals 118 to the power switch 130. It is appreciated that the switching circuit 110 in FIG. 1A includes a $5^{th}$ pin receiving a signal representative of the output voltage (not shown). The controller 111 and the reverse current prevent control block 112 are also coupled to the source terminal S 132 of the power switch 130 through Gnd terminal 116. A bypass capacitance $C_{Bp}$ 136 is coupled to the bypass supply BP 135.

Figure 1B:
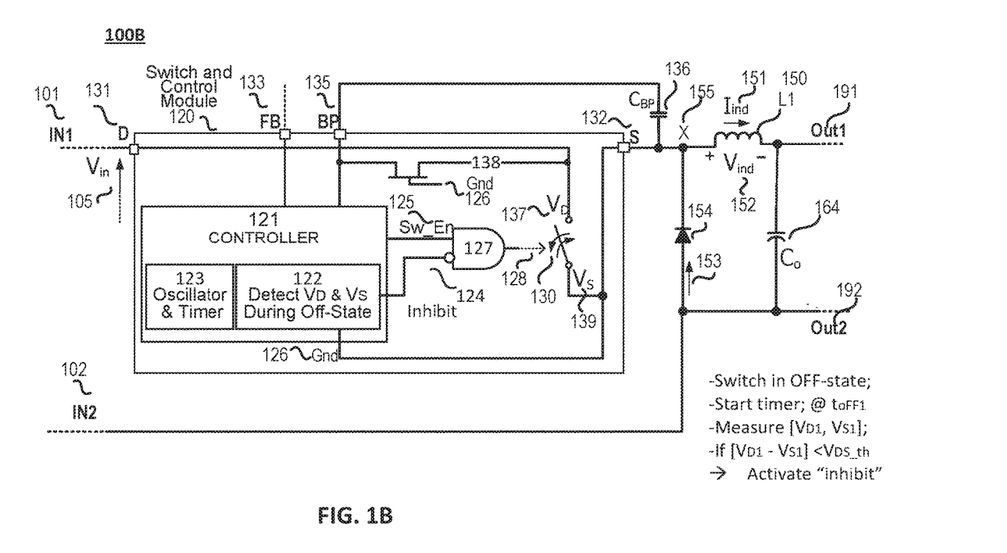

FIG. 1B illustrates an example Buck power converter 100B similar to 100A. In one embodiment the controller 121 includes block 122 that detects the drain voltage $V_D$ 137. The controller 121 also includes the oscillator & time 123. The drain voltage $V_D$ 137 is coupled to the controller 121 and to block 122 through a coupling 138 that in one example could be the tap terminal of a MOSFET power switch and may also provide the bypass supply BP 135 for the controller 161. Controller 121 and block 122 are also coupled to the source terminal S 132 of the power switch 130 through terminal Gnd 126. In accordance with the teachings of the present invention, the reverse current through the switch can be prevented by detecting the voltage difference between the drain voltage ($V_D$) 137 and the source voltage ($V_S$) 139 (i.e., $V_D$-$V_S$)and generating an inhibit signal 124, which is coupled to inhibit the switching signal Sw_En 125 through an AND gate 127 to stop the energy transfer by interrupting the normal switching operation of the power switch 130. In one example when power switch 130 is in the OFF-state, a timer is started and at a specific time $t_{OFF1}$, the drain and source voltages, $V_{D1}$ and $V_{S1}$, are measured. In one embodiment if "$V_{DS1}=V_{D1}-V_{S1}$" goes below a threshold ($V_{DS1}<V_{DS\_th}$), the inhibit signal 124 is activated, which through AND gate 127 stops the drive signal 128 and therefore stops the normal switching of the power switch 130 to prevent risk of reverse current through the switch substrate and consequential failure. In one example, to prevent the risk of failure, the power switch 130 can be kept in an idle off-stat (such that zero current passes through the power switch) or in an idle on-state (such that there is an almost zero voltage drop across the power switch).

Figure 1C:
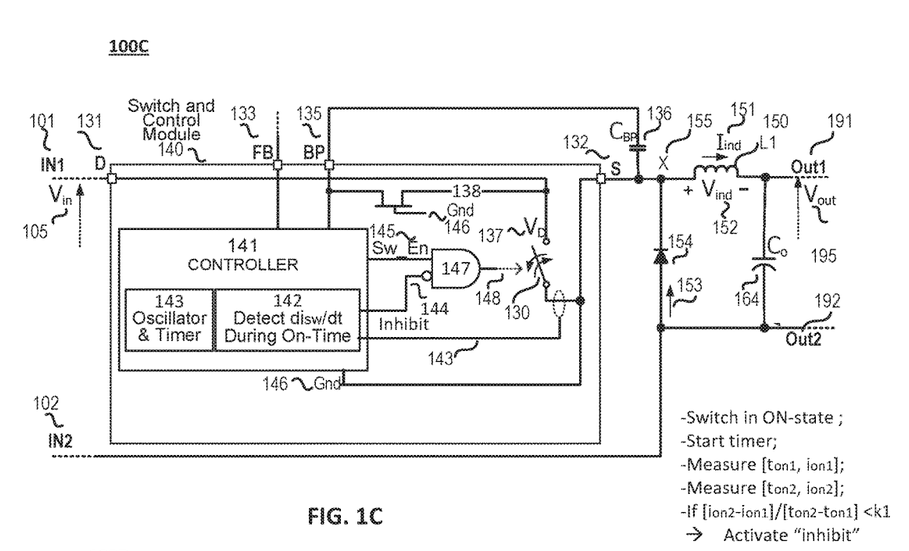

FIG. 1C is an illustration of an example Buck power converter 100C similar to 100A and 100B in :FIGs. 1A and 1B with another example approach of a switching circuit 140. The controller block 141 includes block 142 detecting the rate of change $di_{ind}$/dt of the inductor current $i_{ind}$, during on-state is the same as the current through the power switch 130. The controller block 141 also includes the oscillator & time 143. Block 142 receives the switch current signal 143. In one example the switch current signal 143 may be measured through an integrated sense FET in the power switch structure. During the on-state, a timer is started and block 142 measures $i_{on1}$ at time $t_{on1}$ and $i_{on2}$ at time $t_{on2}$ to calculate the rising slope of the switching current that defines the voltage $V_{ind}$ 152 across the inductor:

$$L1 \cdot [(ion2-ion1)/(ton2-ton1)] = V_{ind} = V_{in} - V_o \qquad (2)$$

In one example if the input voltage $V_{in}$ comes near the output voltage $V_o$, or due to any oscillation, if the input voltage $V_{in}$ drops below $V_o$, it may indicate a risk of failure due to the reverse current through the substrate. In practice to consider enough margin, the block 142 activates the inhibit signal 1144 whenever the rising slope of the inductor current goes below a threshold level defined as below:

$$V_{ind}=V_{in}-V_o=L1 \cdot (di_{ind}/dt)=L1 \cdot [(ion2-ion1)/(ton2-ton1)] \le k1 \qquad (3)$$

As shown in the depicted example, AND logic gate 147 is coupled to receive a switching signal Sw_En 145 from the controller 161 on the first input, and the inhibit signal 144 on the second inverted input. Accordingly, AND logic gate 147 is coupled to disable the drive signal 148 in response to inhibit signal 144 to keep the switch 130 in an idle off-state or idle on-state to avoid the failure due to reverse current through the switch substrate in accordance with the teachings of the present invention.

Figure 1D:
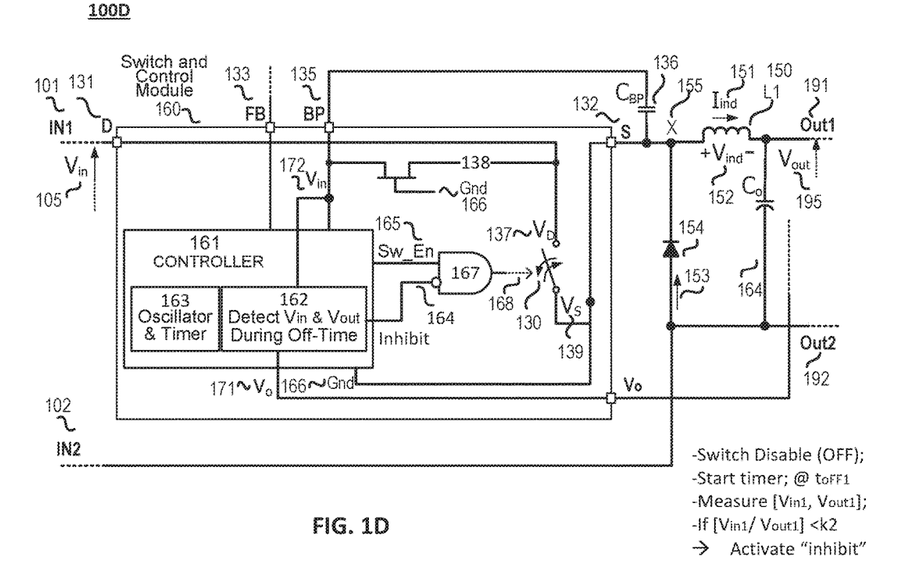

FIG. 1D illustrates an example Buck power converter 100D similar to FIGS. 1A, 1B, and 1C with a third example of the switching circuit 160. The controller block 161 includes block 162 detecting input voltage $V_{in}$ 172 through the drain terminal or the MOSFET tap coupling 138, which in one example may also provide the bypass supply BP 135 for the controller 161. The controller block 161 also includes the oscillator & time 163. Block 162 may also receive the output voltage $V_o$, 171 from the Buck power converter output terminal Out1 191 (signal 195) during the power switch 130 off-state. In one example, a timer is coupled to allow at a specific time $t_{OFF1}$ measurement of $V_{in1}$ and $V_{o1}$ to calculate $V_{in1} - V_{o1}$ and activate the inhibit signal 164 whenever $V_{in1}-V_{o1} \le \Delta V_{thresh}$.

It is appreciated that in another example $V_{in1}/V_{o1} \le k2$ may activate the inhibit signal 164. The AND logic gate 167 by receiving the switching signal Sw_En 165 from the controller 161 on one input and the inhibit signal 164 on its inverted input is coupled to disable the drive signal 168 in response to inhibit signal 164 to keep the power switch 130 in an idle off-state or idle on-state to avoid the controller failure due to the reverse current through the substrate in accordance with the teachings of the present invention.

Figure 2:
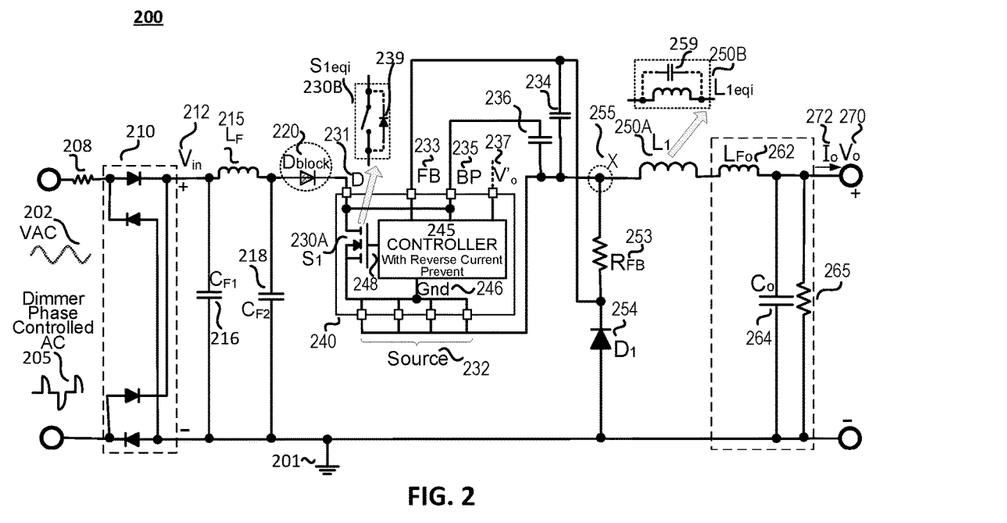
FIG. 2 is a more detailed circuit diagram of an example Buck converter having a high side switching circuit with another example of the reverse current prevent function wherein the feedback current is sensed in the path of the Buck freewheeling diode.

FIG. 2 illustrates an example of a more detailed circuit diagram of an off-line Buck converter 200 that at an input may be coupled to either the ac line supply $V_{Ac}$ voltage 202 or through an optional dimmer circuitry to the dimmer phase controlled ac voltage 205 in accordance with the teachings of the present invention. Dimmer circuitry may include a leading edge or trailing edge phase control Triac dimmer. The ac voltage through a fusible resistor 208 is coupled to the full-bridge rectifier module 210.

Buck converter 200 further receives at an input, between a high side positive rail and a low side negative rail, the rectified sinusoidal ac input voltage $V_{in}$ 212, which is positive with respect to a primary ground 201. In one example an input pi ($\pi$) filter including capacitor $C_{F1}$ 216, inductor $L_F$ 215 and capacitor $C_{F2}$ 218 may also be included at the input as shown to provide a filtering function for the switching noise and electromagnetic interference (EMI). For power converters with power factor correction (ITC), the total input filter capacitance between the positive rail and the negative rail of input ($C_{F1}$ +$C_{F2}$) should be kept small to allow the voltage $V_{in}$ 212 at the input to substantially follow the line rectified sinusoidal voltage 202 (without dimmer) or 205 (with dimmer). In other words, the total capacitance of the input filter capacitor is selected such that at line voltage zero crossing the voltage on the input filter capacitor also reaches substantially zero. However, for power converters without PFC, the capacitance of input capacitor(s) may be selected large enough such that a substantially dc voltage $V_{in}$ 212 is applied at the input of Buck converter 200.

Buck converter 200 further includes switching circuit 240. Controller 245 is coupled to control power switch S1 230A that in one example is equivalent to a switching device S1$_{equi}$ 230B consisting of an ideal switch and an antiparallel diode that may simulate the body diode and the substrate conduction. In one example the switching circuit 240 including the controller 245 and power switch S1 230A may be included in a monolithic or hybrid integrated circuit IC. The switching circuit 240 is a 4 or 5 terminal (4-pin or 5-pin) device with external pins for drain 231, source 232, feedback FB 233 across capacitor 234 and supply terminal BP 235 via capacitor 236. There may be a fifth pin 237 receiving a voltage $V'_o$ representative of the output voltage. The ground connection Gnd pin 232 of the switching circuit 240 is referenced to the source interconnect 232 of the power switch 230A located on the high side positive rail. In one example source 232 of the switch may consist of multiple interconnected pins for a better heat transfer management.

Since the switching circuit 240 may be a 4-terminal device having a single sensing terminal (feedback terminal FB 233), all information relating to sensing the output current during normal operation and output over voltage protection (OVP) at no-load are conveyed to the feedback terminal FB 233 of the switching circuit 240.

In example of FIG. 2 current may be supplied to bypass terminal BP 235 from inside the switching circuit 240. In one embodiment the supply for the controller may be provided from tap of the MOSFET, which in one example is internally cascaded with a normally on JFET (not shown), and coupled across the external capacitor 236 through pin BP 235. In some embodiments the supply for the switch and control module 240 may be provided by coupling the BP pin to the output dc voltage of the Buck power converter or through an auxiliary winding on the Buck inductor 150A or through any other external supply.

The output load coupled across output terminals of the power converter is represented by load voltage $V_O$ 270 and load current $I_O$ 272. In some example of the LED lighting load, to regulate the load current for a controlled/dimming output light of the LED, the output sense or feedback signal FB 233 is representative of the output current To 272. Output sense through FB signal 272 may include a voltage signal or a current signal.

Buck converter 200 further includes freewheeling/circulating diode D1 254, Buck inductor L1 250A, output filter inductor $L_{FO}$ 262 and output bulk capacitor $C_O$ 264. In one example, the load coupling to the output may include an LED string having one or more LEDs. The preload high impedance resistor 265 may be included at the output of Buck converter 200 to provide a minimum load and a better stability in the case of Triac dimmer to provide a minimum holding current for the Triac dimmer in low dim to ensure correct operation at low/no load conditions.

In one example, the Buck inductor L1 250A may be introduced by a module of $L_{1equi}$ 250B presenting an ideal inductor in parallel with a parasitic capacitance 259. In operation, when switch 230A is turned on, current may flow from input to the inductor L1 250A, thereby charging output capacitor $C_O$ 264 and providing power to the load. When switch 230A is turned off, current has a circulating flow through the inductor L1 250A, capacitor $C_O$ 264 and through external load returning back through the freewheeling diode D1 254 thereby ramping down while energy stored in inductor L1 250A discharges.

Controller 245 is coupled to control the switching of switch 230A between an on-state and an off-state with a drive signal generated in response to received FB signals 233, representative of an output load variation, to regulate the output current or output voltage of the converter. In the on-state the current is substantially allowed to flow through switch with low impedance. In the off state the current is substantially prevented from flowing through power switch. It is appreciated, however, that a MOSFET switching device that is modeled as a module S1$_{equi}$ 230B as shown may conduct a current in a reverse direction through the antiparallel body diode 239. Any reverse current due to circuit oscillations or transients may cause instability and device failure.

It is noted that in the prior art, a reverse current blocking diode $D_{block}$ 220 has usually been utilized to block any interrupting reverse current through the switch and avoid failures due to the reverse current. However, as will be discussed, an added feature in the controller in accordance with the teachings of the present invention prevents any reverse current and saves on the external blocking diode $D_{block}$ 220 that otherwise should be added to block the reverse current through the switch.

In a Buck converter with a high side switch, as illustrated for example in FIG. 2, the direct sensing of the dc output load current with a sense resistor at the load side may result in power dissipation, larger heat transfer area due to higher heat dissipation and lower efficiency. As well, due to a voltage reference level difference from that of the controller it may require additional circuitry to shift the reference of the sense signal to match that of the controller.

Based on a solution for a high side switch Buck converter the sensing of the dc output load current may be performed by sensing the pulsating current in the path of the freewheeling diode D1 254 through a feedback sense resistor $R_{FB}$ 253 coupled to the coupling node X 255, The coupling node X 255 is coupled to the reference (ground) of the controller 245, which is coupled to the source terminals 232 of the power switch 230A. The voltage drop across the sense resistor $R_{FB}$ 253 due to the freewheeling current is applied to the feedback terminal FB 233 across the capacitor 234.

The coupling node X 255 is the common coupling point of the inductor L1 250A, resistor $R_{FB}$ 253 (sensing the freewheel current) and the source terminal of switch 230A that is the reference ground of the controller 245.

Figure 3A:
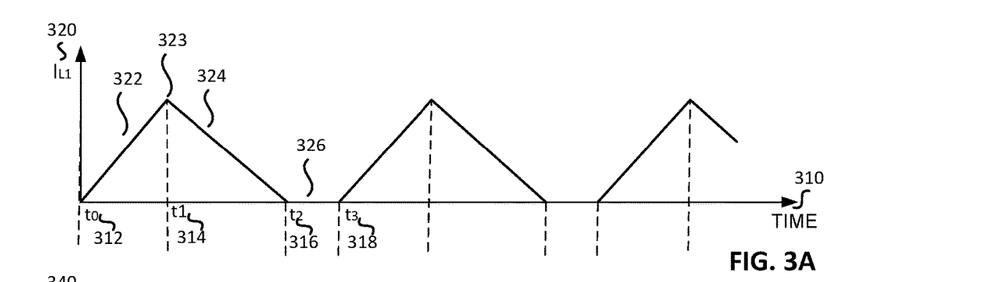
FIGS. 3A and 3B are examples of switching currents and voltage waveforms based on an embodiment of the present disclosure.
Figure 3B:
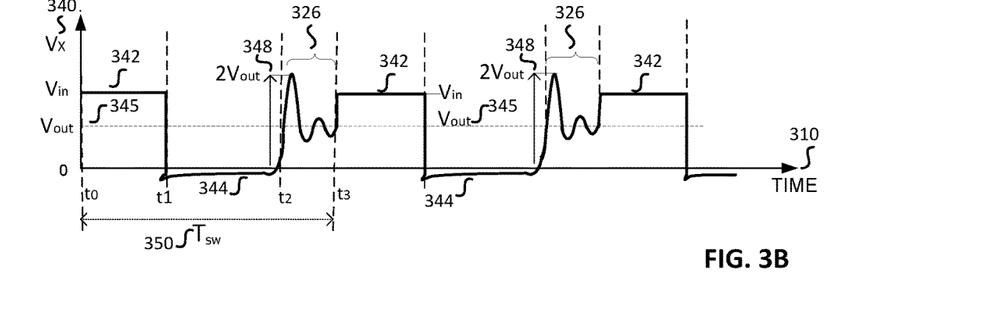

FIG. 3A and 3B illustrate switching waveforms in discontinuous conduction mode DCM operation of a Buck converter. FIG. 3A illustrates the inductor current $I_{L1}$ 320 through inductor L1 250A versus time 310, and FIG. 3B illusrates the voltage $V_x$ 340 at node X 255 (FIG. 2, the common coupling point of switch 230A, inductor L1 250A and the freewheeling diode sense resistor $R_{FB}$ 253) are introduced for a few switching cycles in steady state. When switch 230A is closed and conducting (on-state), the current in inductor L1 250A slopes up 322 during on-time, from time t0 312 to time t1 314, up to a maximum peak point 323 at the end of on-time defined by a current limit. At time t1 314 switch opens (turns off) and inductor current ramps down 324 while current freewheels (circulates) through the freewheel diode D1 254. If operation is in discontinuous conduction mode (DCM), the energy stored in the inductor Li 250A is completely discharged at time t2 316 to stay at zero for a time duration 326 before next switch turn on at time t3 318.

On the other hand FIG. 3B shows an example waveform of operation during a switching cycle Tsw 350 for the voltage at coupling node X 255 which is the same as the source terminal of the power switch 230A and the reference level for the controller 245. When power switch 230A is closed (on-state) and conducting, from time t0 312 to time t1 314, the voltage $V_X$ 340 (at coupling node X 245 of FIG. 2) is substantially equal to the input voltage Vin 342 ($V_{in}$ 212 in FIG. 2). As long as the instantaneous value of the input voltage $V_{in}$ remains higher than the output voltage of the Buck converter the inductor current $I_{L1}$ 320 slopes up 322 to a peak value 323 at time $t_1$ 314.

When switch opens (off-state), the freewheeling diode D1 254 starts conducting the discharge current of the inductor L1 250A. Inductor current $I_{L1}$ 320 ramps down 324 and voltage $V_X$ 340 at the coupling node X 255 at time t1 314 goes to around zero level 344 that is by a small amount of the voltage drop on the freewheeling diode D1 254 and sense resistor $R_{FB}$ 253 below the load reference ground level 201.

In DCM when all the energy in the inductor L1 250A is discharged, the inductor current $I_{L1}$ 320 drops to zero 326 and remains on zero between time $t_2$ 316 and time $t_3$ 318. The coupling node X 255 becomes floating with idle oscillations until voltage $V_x$ 340 at coupling node X 255 settles down to the output voltage $V_{out}$ 345 or until next switching cycle begins. The idle oscillations may happen because of the circuit components and the board parasitic. In one example the stray parasitic capacitance 259 of the inductor L1$_{equal}$ 250B resonates with the circuit inductance. The circuit inductance mainly includes the Buck inductor L1 250A plus the parasitic inductance of the circuit board traces. At time t3 318 by the power switch turn-on, at the beginning of the next switching cycle, the voltage at coupling nodes X 255 is forced back again to the input voltage Vin 342. The peak resonance voltage 348 can be as high as 2*$V_{out}$ 345. In one example for a critical conduction mode (CrM) of the Buck converter, the switch turn-on for the next switching cycle is delayed until the oscillating voltage has reached to $V_{in}$ to achieve a zero voltage switching (ZVS) for a benefit of minimum switching loss and an optimum efficiency.

It is appreciated that in operation, there may be propagation delays in the control blocks and in driver. In addition, there may be variations in the inductor L1 250B value and its stray parasitic capacitance $C_r$ 259, which make it difficult to force the switch turn-on at the exact time of $V_X$=Vin. If switch turns on when $V_X$>Vin, without the external blocking diode D$_{block}$ 220, the reverse current may go through the power switch S$_{1equi}$ 230B.

Specifically, in an integrated circuit (IC) example of the switching circuit in which the power switch S$_{1equi}$ 230B and controller 245 are formed on a single die in a single module 240, a reverse current conduction may occur through the body diode that may inject current into the substrate, which may result in the variation and level shift of the reference in the controller. This may result in instability causing the chip to latch up, and could even result in a failure as a consequence.

Thus, with such known problems of reliability, it appears that the external blocking diode D$_{block}$ 220 may be necessary to block the reverse current whenever $V_X$ may go higher than Vin. However, insertion of the blocking diode inversely affects the component count, board area, cost and efficiency.

Therefore, examples in accordance with the teachings of the present invention provide new systematic ways to include new features and functions in the controller that allow removal of the external blocking diode D$_{block}$ 220 (in FIG. 2) without sacrifice of system reliability in preventing the reverse current through body diode of the switch.

Figure 4A:
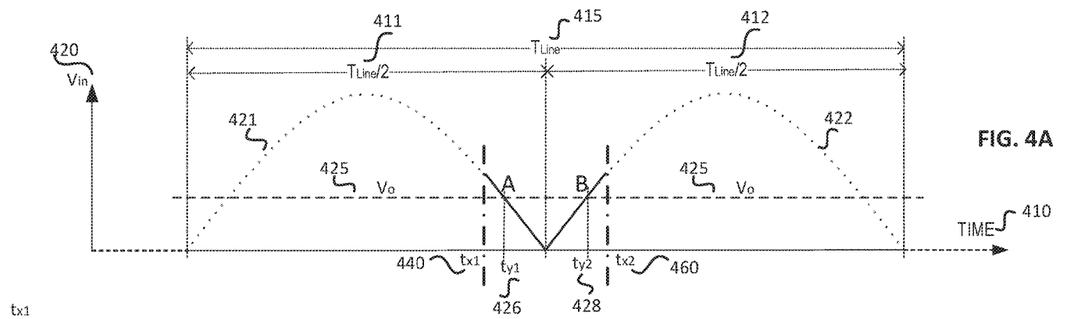
FIGS. 4A and 4B are simulated waveforms illustrating the possible event of reverse current based on a teaching of the present disclosure.

To illustrate, FIG. 4A shows an example of the condition and possible cause of the reverse current happening through the Buck power switch (e.g., S1 230A in FIG. 2). One line cycle of the input voltage T$_{Line}$, 415 with two half cycles T$_{Line/2}$, 411 and 412 is illustrated in FIG. 4A. The vertical axis $V_{in}$ 420 presents the instantaneous value of the rectified ac input voltage ($V_{in}$ 212, FIG. 2) after the rectifier bridge 210 versus time on the horizontal axis 410. In a power converter with power factor correction (PFC), the input capacitance after the rectifier bridge (e.g., C$_{F1}$ 216 and C$_{F2}$ 218 in FIG. 2) is small with no effect on the line sinusoidal shape 421 and 422.

As long as the sinusoidal instantaneous value of the input voltage $V_{in}$ 420 is higher than the output voltage Vo 425, the Buck converter operates to regulate based on duty cycle (on-time) control relationship: $D=Vo/V_{in}$.

Figure 4B:
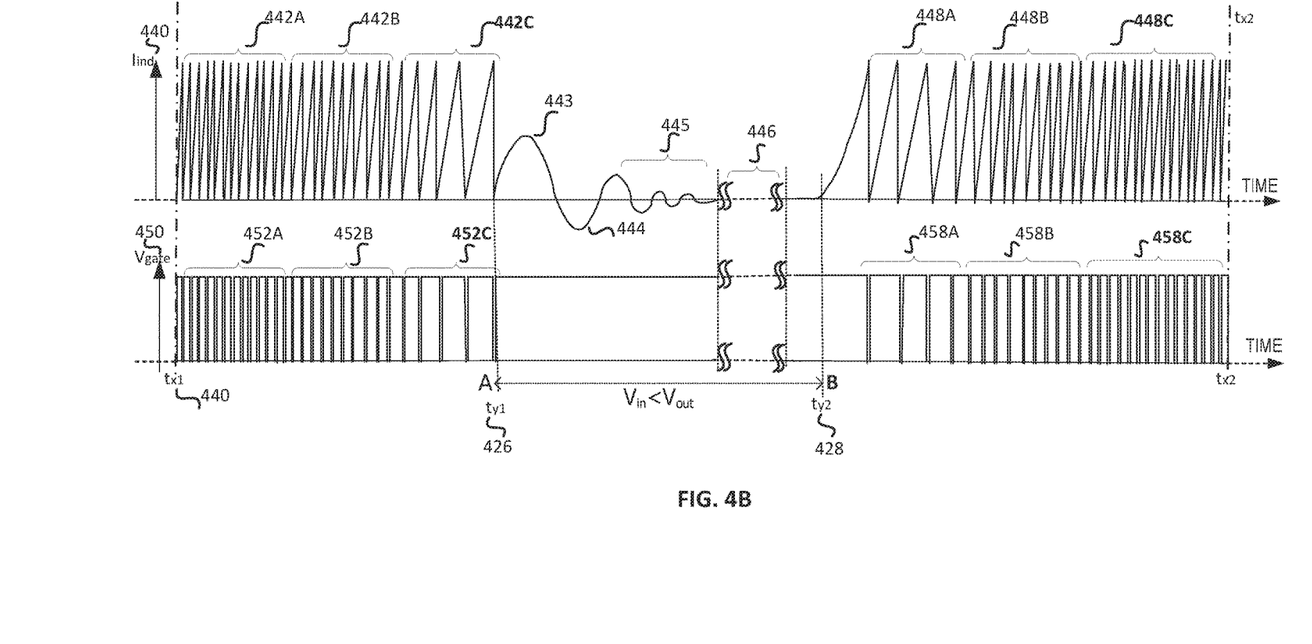

FIG. 4B is a zoomed-in view of the inductor current I$_{ind}$ 440 and the gate voltage V$_{gate}$ 450 (FIG. 2, gate signal 248 of the power switch S1 230A) during a time interval from $t_{x1}$ 440 to $t_{x2}$ 460 that the input voltage $V_{in}$ 420 instantaneous value slopes down towards and may go below the output voltage $V_o$ 425. The on-time and time period of the gate pulse V$_{gate}$ 450 is gradually increased (from interval 452A to 452B and to 452C). The switching period of the inductor current I$_{ind}$ 440 along with the increased duty cycle also increases (from interval 442A to 442B and to 442C).

At point A, time $t_{y1}$ 426, $V_{in}=V_o$, the duty cycle has reached a maximum and the switch S1 230A remains on for the entire time interval from $t_{y1}$ 426 to $t_{y2}$ 428 (from point A to B), which in the zoomed-in area of FIG. 4B includes a broken time interval 446. At time interval $t_{y1}$ 426 to $t_{y2}$ 428, the power switch S1 230A remains in an on-state with no further switching, and an idle parasitic damped oscillation may occur with a maximum positive peak 443 and a maximum negative peak 444 followed by damping oscillation 445 that may last for a portion of or the entire interval A-B while $V_{in}<V_o$ (time interval $t_{y1}$ 426 to $t_{y2}$ 428).

At time $t_{y2}$ 428 (point B), the instantaneous value of input voltage $V_{in}$ 420 increases and goes back above the output voltage $V_o$ 425, and then the forced controlled switching resumes. The on-time and period of the gate signals V$_{gate}$ 450 gradually reduce (from interval 458A to 458B and to 458C). The switching period of the inductor current I$_{ind}$ 440 along with the reduced duty cycle are also reduced (from interval 448A to 448B and to 448C).

Figure 5A:
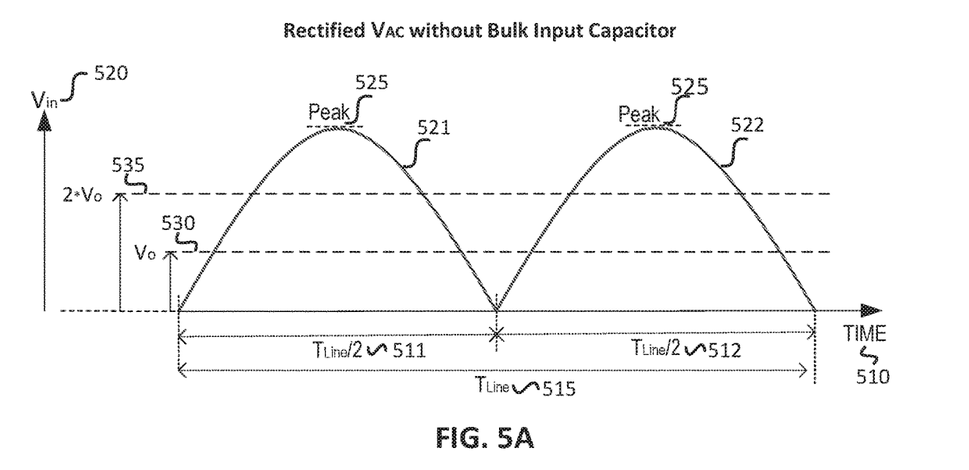
FIGS. 5A and 5B show the input voltage rectified half line cycles with different control zone threshold levels.
Figure 5B:
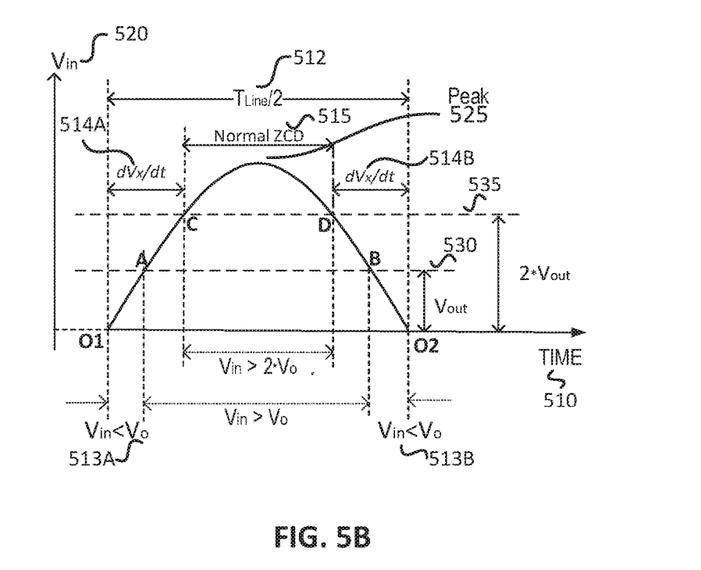

FIGS. 5A and 5B illustrate multiple control zones during each line half cycle in accordance with the teachings of the present invention. FIG. 5A similar to FIG. 4A shows one line cycle T$_{Line}$, 515 after the bridge rectifier 210 with two rectified half cycles T$_{Line/2}$, 511 and 512 of the input voltage ($V_{in}$ 212, FIG. 2). As shown in the illustrated example, each half line cycle is divided to different control zones in accordance with the teachings of the present invention. The vertical axis $V_{in}$ 520 presents the instantaneous value of the ac rectified sinusoidal input voltage versus time on the horizontal axis 510. Because of the small input capacitance after the rectifier bridge (e.g., FIG. 2, C$_{F1}$ 216 and C$_{F2}$ 218) the rectified ac input voltage keeps the line sinusoidal shape 521 and 522.

Two threshold voltage levels of the output voltage $V_o$ 530 and twice the output voltage, 2*$V_o$ 535, are selected that divide each half line cycle to multiple regions, or multiple control zones, with advantageous control and operation performance as illustrated in FIG. 5B, which shows a half line cycle T$_{Line/2}$, 512 with multiple operating regions. In one example, the control process for each half line cycle $T_{Line/2}$, 512 may be divided to two distinct control process zones.

To illustrate, a first control zone 515 may be defined where Vin>2*Vo 418, which is above the threshold level $C_{13}$ D 535 to the peak 525, and where the input voltage $V_{in}$ is higher with enough margin to the Buck output voltage $V_0$. In this region, the control is based on a conventional zero current detection (ZCD) in each switching cycle to keep the Buck regulation in a discontinuous or critical conduction mode of operation with well known advantages.

A second control zone 514A and 514B may be defined where Vin<2*Vo (below the threshold level $C_{13}$ D 535 to the zero line, cross points $O1_{13}$ O2). In this control zone, the control may be based on a $dV_x/dt$ detection to recognize the crossing point A and B where input voltage equals the output voltage (Vin=Vo). In a pulse width modulation (PWM) control scheme, the duty cycle inversely increases when the line sinusoidal voltage decreases and around the zero crossing, the duty cycle may reach D=1.

Below the threshold of A_B 530 where input voltage Vin shows less than the output voltage Vo the duty cycle is kept idle at D=1 and power switch 230A remains steady closed (on-state) for the whole region of Vin<Vo. As explained in FIG. 4A and FIG. 4B in this region any oscillations may cause risk of failure due to the reverse current through the substrate that is prevented by keeping the switch in an on-state during the whole region of Vin<Vo, below threshold level A_B 530 to the zero cross line O1_O2, or in regions 513A and 513B.

Figure 6A:
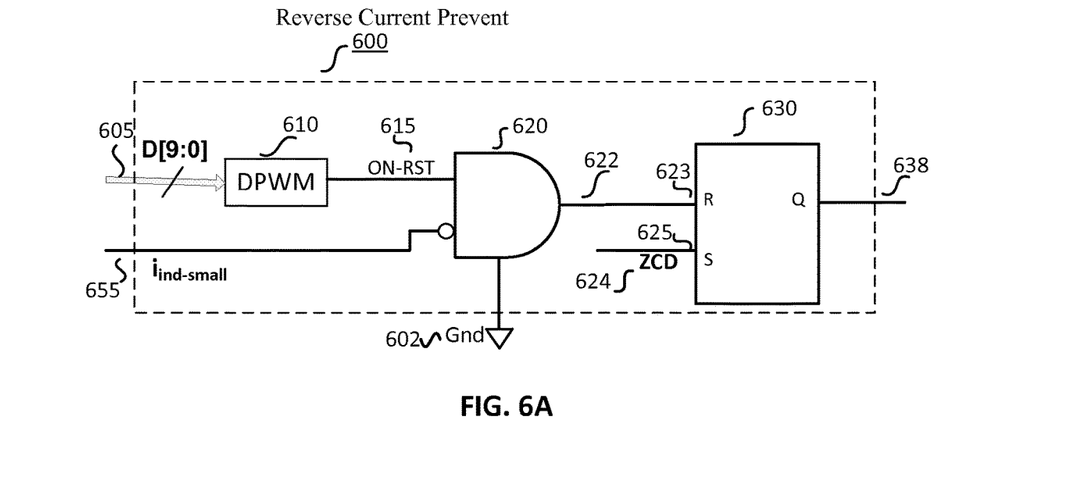
FIGS. 6A and 6B show one example of the implementation logic blocks based on teaching of the present disclosure.
Figure 6B:
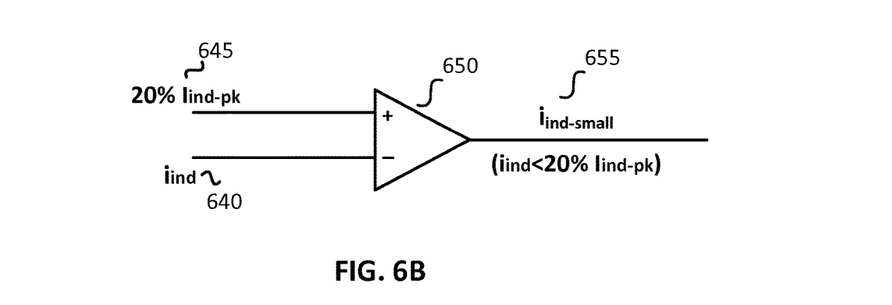

The following example of implementation in FIG. 6A and FIG. 6B shows an embodiment of the present application to prevent the reverse current through the Buck power switch that may occur due to any oscillations whenever input voltage goes below the output voltage. The idle oscillation may happen in DCM during an off-state of the power switch and may forward bias the body diode conducting the reverse current. Under such conditions based on teaching of the present invention in one example the duty cycle is latched to D=1 and switch remains in the on-state (closed) for the entire time interval that the input voltage is below the output voltage Vin<Vo.

FIG. 6A and FIG. 6B show a simple example of implementation logic for a controller block to prevent the reverse current through a high side switch of Buck converter based on teaching of the present application. The simple logic block illustrated FIG. 6A symbolically introduces an example of the reverse current prevent control block 600 responsive to a digital control signal 605, which in one example may be a 10 bit signal D[9:0]. The digital pulse width modulation block (DPWM) 610 receives the digital signal stream. In one example the 10 bit switching signal 605 could be responsive to the feedback FB signal 233 in FIG. 2. The ON-RST signal 615 is generated through the digital pulse width modulation block DPWM 610 in response to the digital control signal 605.

The logic AND gate 620 on the first input terminal 615 receives the digital ON-RST signal 615 from the digital pulse width modulation (DPWM) block 610 in response to the stream 605 D[9:0]. The second inversed input terminal of the logic AND gate 620 receives a below threshold inductor current signal $i_{ind-small}$ 655, which indicates if the inductor current has gone below a threshold. In one example it may represent if the rectified sinusoidal ac input voltage has decreased to a threshold near or below the output voltage of the Buck converter. The output which generates the reset signal 622 of the logic AND gate 620 couples to terminal R

623 of the flip-flop unit 630 and resets whenever the $i_{ind-small}$ signal 655 is not activated. The Set input terminal 625 of the flip-flop 630 is coupled to the zero current detection signal (ZCD) 624 for critical conduction mode (CrM) or discontinuous conduction mode (DCM) operation of the Buck converter when the input voltage $V_{in}$ with large enough margin is higher than the output voltage $V_{o-}$. The logic AND gate 620 also has a terminal coupled to the ground GND 602.

As long as the rectified sinusoidal ac input voltage is higher than a threshold above the output voltage the $i_{in-small}$ signal 655 is not activated and the ON-RST signals 615 from the digital pulse width modulation (DPWM) unit 610 are applied to the R terminal 623 of the flip-flop unit 630. The flip-flop unit 630 receives the zero current detection signal ZCD 624 on the S terminal 625. The output 638 of the flip-flop unit 630 generates the drive signal for the Buck power switch (e.g., 230A in FIG. 2) for a normal operation of the Buck converter. The resetting signal 622 on terminal R 623 may stop the switching signal and latch the switch in the on-state whenever the below threshold inductor current signal $i_{ind-small}$ 655 is activated. If the $i_{ind-small}$ signal 655 on inverted input of the AND gate 620 is activated, the flip-flop unit 630 cannot be reset and the drive signal 638 latches on high to keep the power switch in an on-state and prevent controller damage due to the reverse current through the substrate in accordance with the teachings of the present invention.

FIG. 6B illustrates a simple comparator that could be used to generate the $i_{ind-small}$ signal 655. The inductor current $i_{ind}$ 640 on the inverted input of the comparator 650 is compared to the signal 645 on the non-inverted input, which represents 20% of the inductor current peak value $i_{ind-pk}$. The output signal 655 $i_{ind-small}$ is activated, or goes high, whenever the inductor current is less than 20% of the peak inductor current ($i_{ind}$<20% $i_{ind-pk}$), which is indication that the input voltage $V_{in}$ is approaching the output voltage $V_o$.

Figure 7:
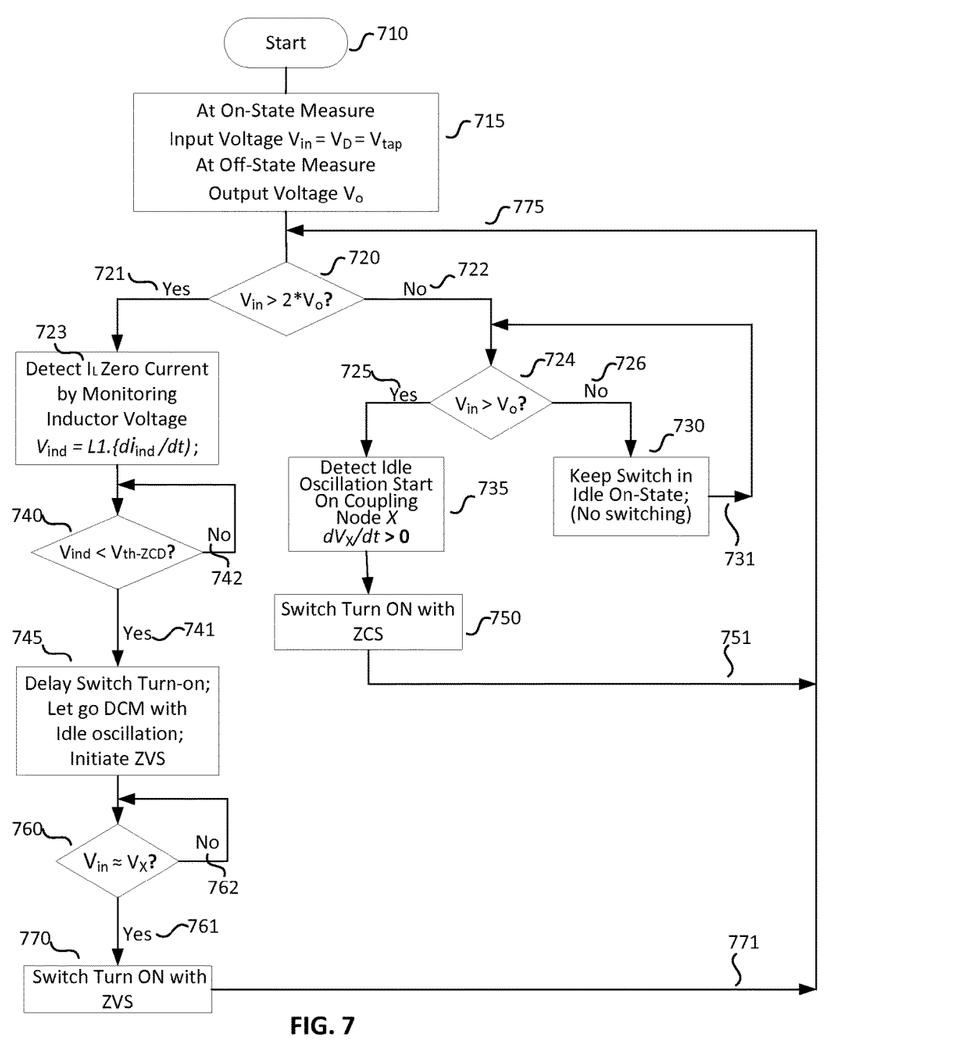
FIG. 7 is a flow chart showing the process of different control zones in a half line cycle.

FIG. 7 is an example flow chart that summarizes an example control process in a half line cycle as described in FIG. 5A and FIG. 5B in accordance with the teachings of the present invention. The multiple control zones are explained for a half line cycle below.

When the process starts (block 710), in block 715 during the on-state of the power switch, the input voltage $V_{in}$ that is same as the drain voltage $V_D$ is measured through the tap terminal $V_{in}=V_D=V_{tap}$. The output voltage $V_o$ is measured during the off-state. In condition block 720, the input voltage $V_{in}$ would be compared to two times of the output voltage $V_o$. The output voltage $V_e$ could either be directly or indirectly measured. In a 5-pin device, if the extra terminal $V_o'$ 237 (FIG. 2) is available, the measurement may be direct. However, in a 4-pin device, the measurement may be indirectly retrieved from feedback information of the current in freewheeling path or the current in the inductor during switch off-state.

As long as $V^{in}$>2*$V_o$, option Yes 721, the control zone remains in zero current detection (ZCD) of the inductor discharge current for a critical or discontinuous conduction mode of operation (CrM or DCM). The switch turn-on is controlled by a normal zero current detection, e.g., with a fixed delay after the inductor current hits the zero (block 723). In one example inductor zero current detection is by measuring voltage across the inductor L1 by Monitoring $V_{ind}=L1 \cdot (di_{Lind}/dt)$. When this voltage drops to a certain threshold level during the switch off-state, in conditional block 740 and the Yes option 741, a zero current detection (ZCD) signal is generated. In conditional block 740 and the No option 742, the control loop is folded back to conditional block 740. After detecting the zero current (block 745), a delay in the switch turn on allows an idle oscillation to force the voltage $V_x$ on the coupling node X 255 towards the input voltage $V_{in}$ in the conditional block 760 and the Yes option 761. The switch turn-on at $V_x=V_{in}$ allows the use of a zero voltage switching (ZVS) (block 770), a lower switch turn-on loss, and a higher efficiency. Then the control process folds back through 771 and 775 to the conditional block 720 for the next switching cycle. Node X 255 in FIG. 2 is the coupling point of inductor L1 250A, switch S1 230A and the sense resistor 253 in the current path of the freewheeling diode D1 254. In the conditional block 760 and the No option 762, the control loop is folded back to conditional block 760.

When the input voltage $V_{in}$ goes below two times the output voltage $V_o$, $V_{in}<2*Vo$, or option No 722, processing goes to the conditional block 724 to compare the input and output voltages $V_{in}$ and $V_o$. If $V_{in}<2*V_o$ and $V_{in}>V_o$ (i.e., $2*V_o>V_{in}>V_o$), or option yes 725, the control zone changes to 514A and 514B in FIG. 5B that is by the voltage change detection on the coupling node X ($dV_x/dt$) to control the switch turn-on time (block 735). In this control zone, instead of waiting for the voltage across the inductor to drop below a threshold level ($V_{ind}<V_{th-ZCS}$), the switch turn-on is by sensing a voltage rate change (block 750). In one example, as soon as $dV_x/dt$ of the idle oscillation is detected, which is a sign of inductor current hitting zero, with a minimum delay the power switch is turned on. This way the operation remains in critical mode CrM, voltage $V_x$ on coupling node X 255 cannot rise high and the only rise is due to the propagation delay of the control blocks. After the switch turns on, the control loop folds back through 751 and 775 to the conditional block 720 for the next switching cycle.

At option No 726 of the conditional block 724, when the input voltage $V_{in}$ is changing towards the output voltage $V_0$, any possible oscillation on the voltage $V_x$ at the coupling node X 255 may cause this voltage to go above $V_{in}$ and initiate a reverse current through the power switch that may be conducted through the body diode and substrate causing failure in the controller. Under such a condition when input voltage $V_{in}$ goes below the output voltage Vo, a peak current control takes over, and instead of the constant on-time control the switch turns on and remains in an idle on-state during all the time interval that $V_{in}$ <Vo (block 730) and control loop is folded back to the conditional block 724 through 731 until input voltage $V_{in}$ goes again above the output voltage Vo and the control zone changes.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A switching circuit with reverse current prevention for use in a Buck converter, comprising:
    a power switch coupled between an input of the Buck converter and a coupling node of the Buck converter, wherein the coupling node is an interconnection point of the power switch, an inductor, and a freewheeling diode, wherein the inductor is coupled between the coupling node and an output of the Buck converter, and wherein the freewheeling diode is coupled between the coupling node and an output return of the Buck converter;
    a controller to receive a feedback signal representative of the output of the Buck converter, wherein the controller generates a drive signal to control switching of the power switch to regulate a transfer of energy from the input of the Buck converter through the inductor to the output of the Buck converter; and
    a reverse current prevention circuit included in the controller to detect a reverse current condition of the power switch, wherein the reverse current prevention circuit generates an inhibit signal in response to the reverse current condition, wherein the power switch is inhibited from receiving the drive signal in response to the inhibit signal to inhibit a reverse current through the power switch, wherein the reverse current prevention circuit senses a rectified sinusoidal ac input voltage received by the input of the Buck converter and an output voltage of the Buck converter during an off-state of the power switch, wherein the reverse current prevention circuit detects the reverse current condition of the power switch in response to a comparison of the rectified sinusoidal ac input voltage and the output voltage of the Buck converter when an instantaneous value of the rectified sinusoidal ac input voltage comes near to the output voltage of the Buck converter.

2. The switching circuit of claim 1 wherein the reverse current prevention circuit detects the reverse current condition of the power switch in response to a difference between a drain voltage of the power switch and a source voltage of the power switch during an off-state of the power switch.

3. The switching circuit of claim 1, wherein the controller maintains the power switch in an on-state while the instantaneous value of the rectified sinusoidal ac input voltage comes near to the output voltage of the Buck converter.

4. The switching circuit of claim 1 wherein the controller maintains the power switch in an off-state while the instantaneous value of the rectified sinusoidal ac input voltage comes near to the output voltage of the Buck converter.

5. The switching circuit of claim 1 wherein the controller maintains the power switch in an on-state while the instantaneous value of the rectified sinusoidal ac input voltage is within a threshold value above the output voltage of the Buck converter, wherein the power switch in the on-state provides a low impedance path for the reverse current through the power switch to avoid a controller failure due to substrate conduction.

6. The switching circuit of claim 1, wherein the controller maintains the power switch in an off-state while the instantaneous value of the rectified sinusoidal ac input voltage is within a threshold value above the output voltage of the Buck converter to prevent any reverse current through a substrate to prevent a controller failure.

7. The switching circuit of claim 1, wherein the feedback signal is retrieved in response to a freewheeling current through the freewheeling diode, wherein the feedback signal is extracted in response to a voltage drop across a sense resistor coupled to the freewheeling diode.

8. The switching circuit of claim 1, wherein the feedback signal is retrieved in response to a current through the inductor.

9. The switching circuit of claim 1, wherein the feedback signal is retrieved in response to a current through the power switch.

10. The switching circuit of claim 1, wherein the controller receives a bypass voltage, and wherein a reference terminal of the controller is coupled to the coupling node.

11. The switching circuit of claim 10, wherein the bypass voltage is provided through an internal tap terminal of the power switch, and wherein the power switch is integrated with the controller in a single integrated circuit.

12. The switching circuit of claim 1, wherein the Buck converter operates in either a critical conduction mode (CrM) or a discontinuous conduction mode (DCM), wherein during an off-state of the power switch after all stored energy in the inductor is discharged to the output of the Buck converter there is an idle oscillation of a voltage on the coupling node around the output voltage of the Buck converter that settles to the output voltage until a next switching cycle, and wherein the idle oscillation around the output voltage brings the voltage on the coupling node to less than the output voltage causing a condition of the reverse current through the power switch.

13. The switching circuit of claim 12, wherein the controller is responsive to different control zones of each half line cycle of the rectified sinusoidal ac input voltage, wherein the different control zones include:
a first control zone in which the rectified sinusoidal ac input voltage is greater than two times the output voltage;
a second control zone in which the rectified sinusoidal ac input voltage is less than two times the output voltage and greater than the output voltage; and
a third control zone in which the rectified sinusoidal ac input voltage is less than the output voltage.

14. The switching circuit of claim 13, wherein the controller operates in the first control zone to be responsive to a zero current detection of a current through the inductor to keep the Buck converter operation in the DCM with the idle oscillation of the voltage on the coupling node, wherein the power switch turns on when the voltage on the coupling node during the off-state of the power switch equals the rectified sinusoidal ac input voltage.

15. The switching circuit of claim 13, wherein the controller operates in the second control zone to be responsive to detecting a change of the voltage on the coupling node over time to turn the power switch on, and wherein the change of the voltage on the coupling node over time is representative of a zero current through the inductor and the idle oscillation of the voltage on the coupling node starting to provide a zero current turn on of the power switch.

16. The switching circuit of claim 13, wherein the controller operates in the third control zone to keep the power switch in an on-state to provide a low impedance path for the reverse current through the power switch and avoid a controller failure due to substrate conduction.

17. The switching circuit of claim 13, wherein an activation of a below threshold inductor current signal indicates an instantaneous value of the rectified sinusoidal ac input voltage is near the output voltage of the Buck converter in the third control zone, wherein the controller latches the power switch in an on-state in response to the activation of the below threshold inductor current signal, wherein the below threshold inductor current signal is coupled to be deactivated in response to the rectified sinusoidal ac input voltage of the Buck converter increasing to a voltage greater than the output voltage of the Buck converter, and wherein the controller is coupled to resume normal switching of the power switch in response to the below threshold inductor current signal being deactivated.

18. The switching circuit of claim 17 wherein the drive signal is a pulse width modulation signal.

19. A switching circuit with reverse current prevention for use in a Buck converter, comprising:
a power switch coupled between an input of the Buck converter and a coupling node of the Buck converter, wherein the input of the Buck converter receives a rectified sinusoidal ac voltage, wherein the coupling node is an interconnection point of the power switch, an inductor, and a freewheeling diode, wherein the inductor is coupled between the coupling node and an output of the Buck converter, and wherein the freewheeling diode is coupled between the coupling node and an output return of the Buck converter;
a controller to receive a feedback signal representative of the output of the Buck converter, wherein the controller generates a drive signal to control switching of the power switch to regulate a transfer of energy from the input of the Buck converter through the inductor to the output of the Buck converter, wherein the controller receives a bypass voltage, and wherein a reference terminal of the controller is coupled to the coupling node; and
a reverse current prevention circuit included in the controller to detect a reverse current condition of the power switch, wherein the reverse current prevention circuit generates an inhibit signal in response to the reverse current condition, wherein the power switch is inhibited from receiving the drive signal in response to the inhibit signal to inhibit a reverse current through the power switch, and wherein the reverse current prevention switch detects the reverse current condition of the power switch in response to a change in current through the power switch over time during an on-state of the power switch.

* * * * *